United States Patent [19]
White

[11] Patent Number: 5,463,575
[45] Date of Patent: Oct. 31, 1995

[54] REDUCED QUANTIZATION NOISE FROM SINGLE-PRECISION MULTIPLIER

[75] Inventor: Stanley A. White, San Clemente, Calif.

[73] Assignee: Rockwell International Corporation, Seal Beach, Calif.

[21] Appl. No.: 265,170

[22] Filed: Jun. 24, 1994

[51] Int. Cl.⁶ ................................ G06F 7/38; G06F 7/52
[52] U.S. Cl. ............................................. 364/754; 364/745
[58] Field of Search .......................... 364/715.04, 736, 364/745, 754, 757, 748

[56] References Cited

U.S. PATENT DOCUMENTS

| | | | |
|---|---|---|---|
| 4,229,800 | 10/1980 | Gregorian et al. | 364/745 |
| 5,128,889 | 7/1992 | Nakano | 364/748 |
| 5,276,634 | 1/1994 | Suzuki | 364/748 |
| 5,329,475 | 7/1994 | Juri et al. | 364/745 |
| 5,341,319 | 8/1994 | Madden et al. | 364/745 X |

Primary Examiner—Roy N. Envall, Jr.
Assistant Examiner—Chuong D. Ngo
Attorney, Agent, or Firm—George A. Montanye; Charles T. Silberberg; Tom Streeter

[57] ABSTRACT

A single-precision multiplier used in a recursive digital filter is rendered more precise, without resorting to extended-precision or floating-point arithmetic. A double-precision multiplier produces a group of most significant bits (MSBs) and a group of least significant bits (LSBs). The LSBs are processed, including delaying them by one or two clock cycles, and are then added back to the LSBs produced during the present clock cycle. The top few bits of this first sum are right shifted as far as possible and added to the MSBs, the resulting second sum being the output of the overall multiplier.

5 Claims, 3 Drawing Sheets

REDUCED QUANTIZATION NOISE FROM SINGLE-PRECISION MULTIPLIER

BACKGROUND OF THE INVENTION

The present invention relates to digital multipliers used in fixed-point finite-precision recursive digital filters and has particular reference to apparatus for enhancing the precision of a multiplier using single-precision arithmetic without being forced to use extended-precision or floating-point arithmetic.

Multipliers used in fixed-point finite-precision recursive digital filters are the primary source of signal offset ("trapped bits") and roundoff noise. Attempts to avoid these problems drive users to more costly extended-precision or floating-point arithmetic. The invention presented herein is a bit untrapper which permits the use of single-precision arithmetic in applications where conventional wisdom says you can't. The bit untrapper insures that the quantization-noise path is $(1-z^{-1})^m$ where m=0, 1, or 2. The m=0 case is simple rounding; in the other two cases one or two transmission zeros are placed in the quantization-noise path without affecting the signal path.

Since the poles of recursive digital filters are either real or occur in conjugate-complex pairs, any recursive digital filter can be made of first-order recursive section to mechanize real poles and second-order recursive sections to mechanize conjugate-complex pole pairs. First-order bit untrappers are used in first-order filters; both first- and second-order bit untrappers are used in second-order filters. Zeroth-order bit untrapping (rounding) is used for mechanization of zeros or gain scaling.

SUMMARY OF THE INVENTION

FIG. 3 shows a multiplier 10 that outputs a double-precision product. A specific mechanization may be considered in which the multiplier accepts a twenty-four-bit data input 12 to be scaled by a twenty-four-bit coefficient 14 and produces a forty-six-bit product (assuming that the redundant sign and integer bits are suppressed. The data and coefficient format is the following: the most significant bit is the sign bit; the next bit is the integer bit; the remaining twenty-two bits are the fractional bits. The twenty-four most-significant bits (MSBs) 16 of the product follow the data and coefficient format. The remaining twenty-two least-significant bits (LSBs) 18 of the product are in pure unsigned-binary format.

The reduction of the forty-six-bit product to a twenty-four-bit output is called quantization. There are many ways in which one may quantize. In a typical application, the twenty-four MSBs 16 out of the multiplier 10 serve as the product and the LSBs 18 are discarded. This quantizing procedure is called truncation. Sometimes the most-significant bit of the LSBs 18 is added to the least-significant bit of the MSBs 16, then the LSBs 18 are discarded. This quantizing procedure is called rounding. Within recursive-filter loops we need smarter quantizing to generate a more correct twenty-four-bit output within the context of the closed loop application.

The present invention does this by processing the LSBs 18, including summing them with the processed LSBs and delaying them by one or two clock cycles. The top few bits of this first sum are right shifted as far as possible and added to the MSBs 16, the resulting second sum being the output of the overall modified multiplier which is the subject of the present invention.

DETAILED DESCRIPTION OF THE DRAWINGS

Twenty-Four-Bit Implementation

Figure 3:
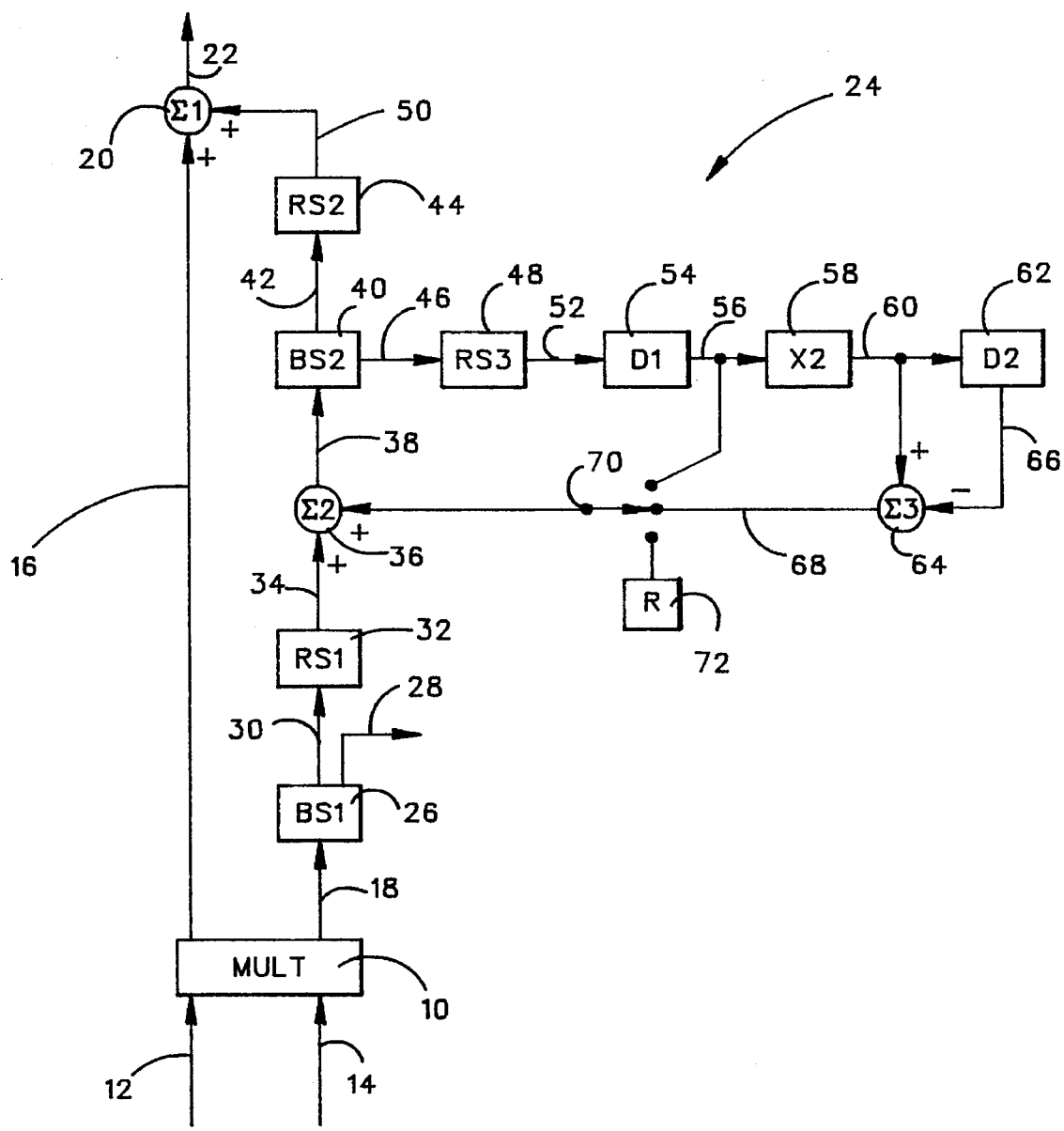
FIG. 3 shows a switchable zeroth-first-second order embodiment of the present invention.

In addition to the multiplier 10, the bit untrapper shown in FIG. 3 requires three adders, two delays, a doubler (e.g., one-bit left shift), and a three-position switch. All data paths are twenty-four-bits wide.

The twenty-four MSBs of the multiplier product drive the first input of first adder 20. In all cases the output of first adder 20 is the output of the overall modified multiplier which is the subject of the present invention.

The top twenty-one bits of the LSBs 18 out from the multiplier are the bottom twenty-one bits for the first input to second adder 36. In order to provide the first input to second adder 36 with a twenty-four-bit data word, the three most-significant bits of the twenty-four-bit data word into the first input to second adder 36 are zero. The bottom bit of the LSBs 18 from the multiplier 10 is discarded. We define the multiplier output truncated to forty-five bits as $x_m$.

The three MSBs (sign bit, integer bit, and most significant fractional bit) of the second adder 36 output are the three LSBs of the second input to first adder 20. In order to provide the second input to first adder 20 with a twenty-four-bit data word, the twenty-one MSBs of that data word are all driven by the sign bit of the second adder 36 output. This is completely equivalent to doing a twenty-one-bit right shift on the output of second adder 36, complete with the correct sign spreading, then using that as the second input to first adder 20.

The twenty-one LSBs out of second adder 36 are the twenty-one LSBs into first delay 54. In order to provide first delay 54 with a twenty-four-bit data word, the three MSBs of the input to first delay 54 are all zero. The twenty-four-bit output of first delay 54 goes to a first position of the switch 70 and to the input of a doubler 58. The output of the doubler 58 goes to the input of second delay 62. Third adder 64 subtracts the output of second delay 62 from the output of the doubler 58. The output 68 of third adder 64 goes to a second position 2 of the switch 70. A third position of the switch 70 is connected to a constant R=000100000000000000000000=¼. The arm of the switch 70 is connected to the second input of second adder 36.

Operation: Zeroth-Order Bit Untrapping (Rounding)

When the switch 70 is in the third position, the most-significant bit of the multiplier's LSBs (which appears as 0 or ¼) is summed with R=¼ and the carry is the LSB of the second input to first adder 20. All other bits of that second input to first adder 20 are zero because there is nothing on the sign-bit line, the integer line, or the ½ line. We have therefore rounded the multiplier output to twenty-four bits.

Operation: Non-Zeroth-Order Bit Untrapping

If the second input to second adder 36 were open, the vertical output lines from the first adder 20 (MSBs) and second adder 36 (LSBs) in the figure would still comprise $x_m$, as do the first inputs to those adders. The truncated output from first adder 20 therefore from the modified multiplier) would be $x_m$–LSBs. Define a quantization error as $q_m$=–LSBs. The input to first delay 54 is therefore LSB=–$q_m$ and the truncated output would be $x_m$+$q_m$. Correspondingly, its z transform would be $X(z)+Q(z)$. We want the z transform of the output to be $X(z)+Q(z)(1-z^{-1})^m$ where m=1 or 2, depending on the switch 70 setting. In either case (i.e., m=1 or 2) there is a transmission zero at dc, blocking any steady-state quantization error from propagating out of the modified multiplier. The corresponding time sequences out are $x_m+(q_m-q_{m-1})$ and $x_m+(q_m-2q_{m-1}+q_{m-2})$.

The output of first delay 54, and therefore the quantity at the first position of switch 70, is –$q_{m-1}$. Since the output of second delay 62 is –$q_{m-2}$, the quantity at the second position of switch 70 is –2 $q_{m-1}$ +$q_{m-2}$. In all cases the output of the modified multiplier is $x_m+q_m$+(switch output).

Operation: First-Order Bit Untrapping

If the switch 70 is in the first position, the output is $x_m+(q_m-q_{m-1})$. Its z transform is $X(z)+Q(z)(1-z^{-1})$.

Operation: Second-Order Bit Untrapping

If the switch 70 is in the second position, the output is $x_m+(q_m-2\,q_{m-1}+q_{m-2})$. Its z transform is $X(z)+Q(z)(1-2\,z^{-1}+z^{-2})=X(z)+Q(z)(1-20z^{-1})^2$.

Non-Switching First-Order Apparatus

Twenty-four-bit arithmetic is common, but the present invention is not limited thereto. Any reasonable number, n, of bits may be accommodated. We shall discuss an n-bit data-word format consisting of a sign bit, an integer bit, and n–2 fraction bits. Thus, in FIG. 1, a double precision multiplier 10 receives two n-bit numbers 12 and 14, and produces a product of 2n–2 bits: n most significant bits (MSBs) 16 (a sign bit, an integer bit, and n–2 fractional bits) and n–2 unsigned least significant bits (LSBs) 18 (all fractional bits). The n MSBs 16 are applied to a first input of a first adder 20, the second input of which is described below. The n-bit output 22 of the first adder 20 is the output of the multiplier 24 as a whole.

A first bit splitter 26 takes the n–2 LSBs 18 and discards the least significant bit 28. It passes on the remaining n–3 bits 30 to a first right shifter 30, which pads the bits 30 with three zeroes on the left and applies the resultant n bits 34 to a first input of a second adder 36, the second input of which is described below. The n-bit output 38 of the second adder 36 is applied to a second bit splitter 40, which applies the three MSBs 42 to a second right shifter 44 and the remaining n–3 LSBs 46 to a third right shifter 28.

The three bits 42 applied to the second right shifter 44 are the sign bit, the integer bit, and the most significant fractional bit. The second right shifter 44 replicates the sign bit n–3 times and places it in the n–2 most significant places of its n-bit output 50. The integer bit and the most significant fractional bit remain in their respective least significant 2-bit places of the output 50. The output 50 is applied to the second input of the first adder 20.

The third right shifter 48, like the first right shifter 32, receives an n–3 bit input and pads it to the left with three zeroes. The third right shifter 48 produces an n-bit output 52, which is applied to a delay unit 54, the output 56 of which (one clock cycle later) is applied to the second input of the second adder 36.

Non-Switching Second-Order Apparatus

Figure 1:
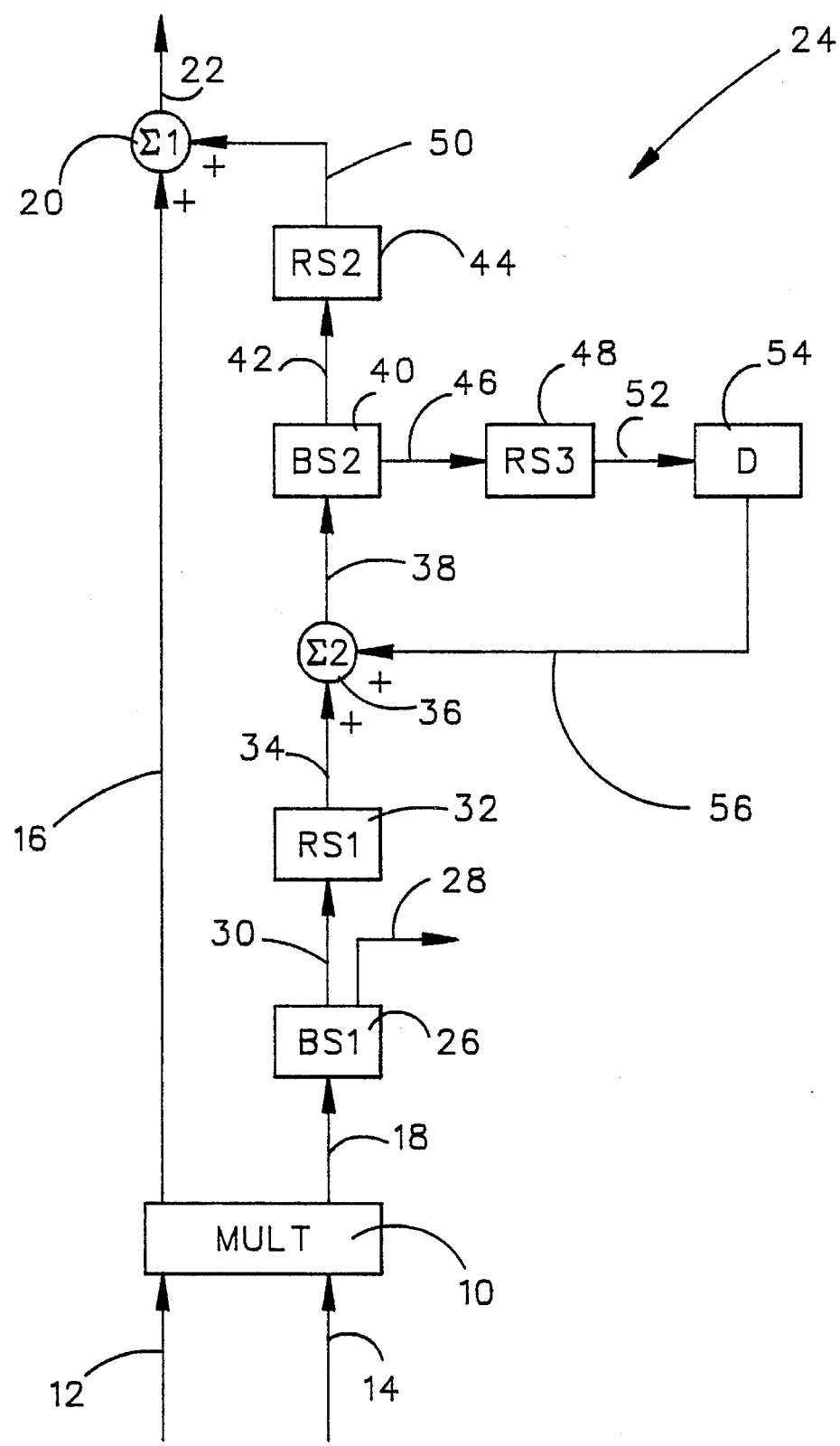
FIG. 1 shows a first order embodiment of the present invention.
Figure 2:
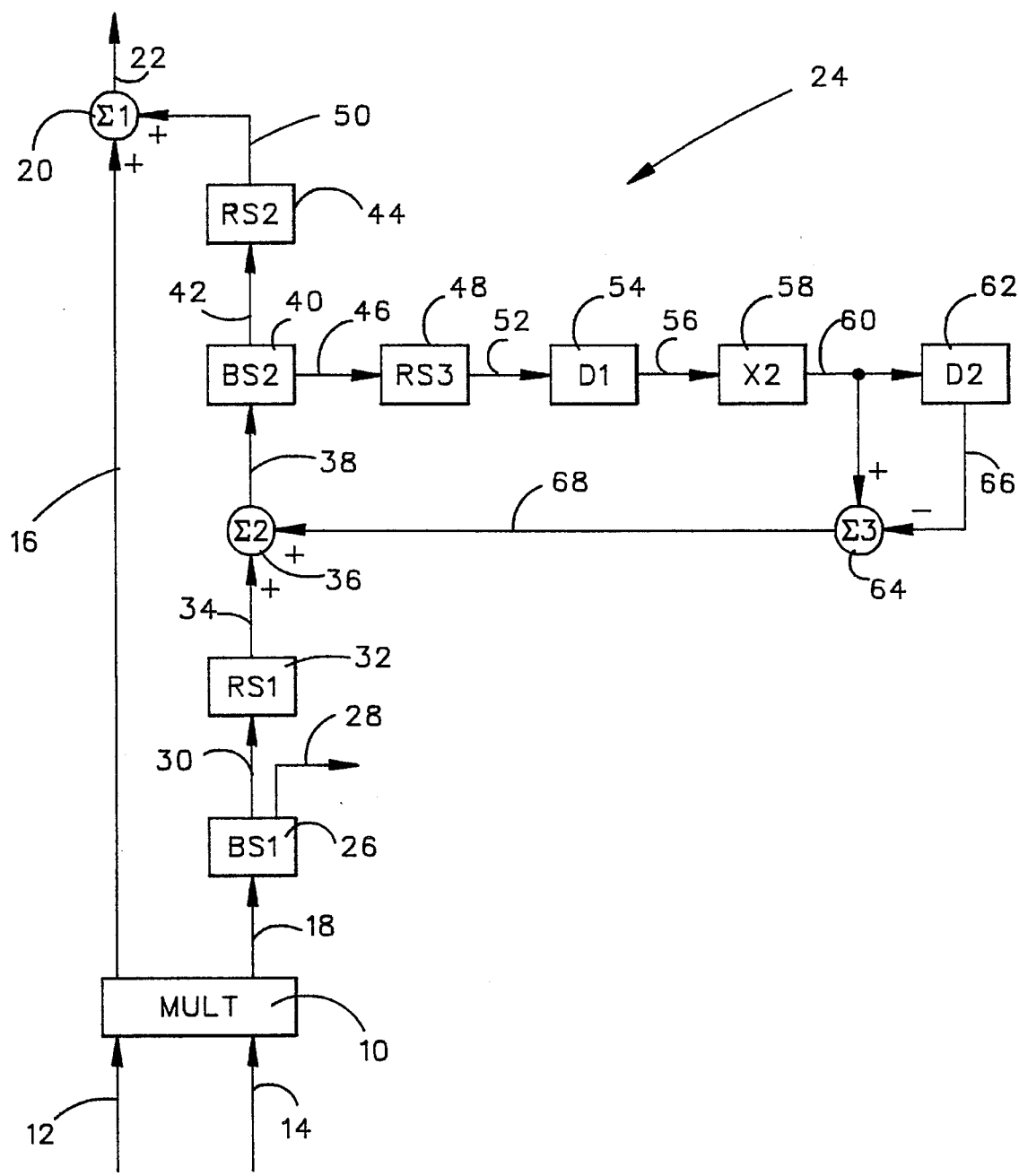
FIG. 2 shows a second order embodiment of the present invention.

FIG. 2 is identical to FIG. 1, except that the delay unit 54 is a first delay unit, and does not drive the second input to the second adder 36 directly. Instead, its output 56 is applied to a doubler 58, the output 60 of which is applied both to a second delay unit 62 and to a plus input of a third adder 64. The output 66 of the second delay unit 64 is applied to a minus input of the third adder 64, and the output 68 of the third adder 64 is applied to the second input of second adder 36.

Switching Apparatus

FIG. 3 is identical to FIG. 2, except that a switch 70 is connected to the second input of the second adder 36. The switch 70 may be connected to the output 56 of the first delay unit 54, as in FIG. 1. Alternatively, it may be connected to the output 68 of the third adder 64, as in FIG. 2. As a third possibility, it may be connected to a rounding constant R, shown as element 72. In the embodiment shown above, R=¼.

Scope of the Invention

The above embodiments assume that twenty-four bit arithmetic will be used, since this is a popular architecture. It is apparent that fixed-point arithmetic using any number, n, of bits may be used, provided only that there be a sign bit, an integer bit, and at least one fractional bit.

It is further apparent that the usefulness of the present invention is not limited to situations where there is only a single integer bit. If each number has n significant bits (whether sign, integer, or fractional), either or both of the numbers may be pre-processed to have:

(a) the sign bit stripped off;

(b) the remaining bits left shifted or right shifted to produce exactly one integer bit; and (c) the sign bit restored;

thereby producing a pair of numbers which may be multiplied in the enhanced multiplier as shown, with the product being post-processed as needed. If desired, apparatus for such pre-and post-processing may be included within the enhanced multiplier (rather than as external hardware) without going beyond the true spirit and scope of the present invention.

Several embodiments of the present invention have been shown, but the true spirit and scope of the present invention are not limited thereto. Instead, such spirit and scope are limited only by the appended claims, and their equivalents.

What is claimed is:

1. An enhanced single-precision arithmetic multiplier for multiplying together two numbers, each number having n bits, namely, one sign bit, one integer bit, and n–2 fractional bits, wherein the enhanced multiplier has an output and comprises:

(a) a double precision multiplier constructed to multiply together the two numbers and to produce a product which has 2n-2 bits, the product comprising:

(1) a most significant bit (MSBS) group of n bits, namely, one sign bit, one integer bit, and n–2 fractional bits; and (2) an unsigned least significant bit (LSB) group of n–2 bits, namely, n–2 fractional bits;

(b) a first adder having:

(1) a first input connected to receive the n-bit MSBS group from the double precision multiplier;

(2) a second input connected to receive the n-bit output of the below-recited second right shifter; and (3) an n-bit output, the output being the output of the enhanced multiplier;

(c) a first bit splitter constructed to:
(1) receive as its input the n–2 bit LSB group from the double precision multiplier; and
(2) produce an output comprising the n–3 MSBs of its input, the LSB of the n–2 bit input being discarded;

(d) a first right shifter constructed to:
(1) receive as its input the n–3 output of the first bit splitter; and
(2) produce an n-bit output comprising three zeroes followed by the n–3 bits of its input;

(e) a second adder having:
(1) a first input connected to receive the n-bit output of the first right shifter;
(2) a second input connected to receive the n-bit output of the below-recited delay element; and
(3) an n-bit output;

(f) a second bit splitter constructed to:
(1) receive as its input the n-bit output of the second adder;
(2) produce a first output comprising the 3 MSBs of its input; and
(3) produce a second output comprising the n–3 LSBs of its input;

(g) a second right shifter constructed to:
(1) receive as its input the 3 bit first output (sign bit, integer bit, and most significant fractional bit) of the second bit splitter;
(2) produce an n-bit output comprising:
(A) as its n–2 MSBs, n–2 repetitions of the sign bit; followed by
(B) the integer input bit; followed by
(C) the most significant fractional input bit; and
(3) apply its n-bit output to the second input of the first adder;

(h) a third right shifter constructed to:
(1) receive as its input the n–3 bit second output of the second bit splitter; and
(2) produce an n-bit output comprising three zeroes followed by the n–3 bits of its input; and (i) a delay unit connected to receive, as its input, the n-bit output of the third right shifter, and to produce, as its output, the n-bit second input of the second adder.

2. An enhanced single-precision arithmetic multiplier for multiplying together two numbers, each number having n bits, namely, one sign bit, one integer bit, and n–2 fractional bits, wherein the enhanced multiplier has an output and comprises:

(a) a double precision multiplier constructed to multiply together the two numbers and to produce a product which has 2n–2 bits, the product comprising:
(1) a most significant bit (MSBS) group of n bits, namely, one sign bit, one integer bit, and n–2 fractional bits; and
(2) an unsigned least significant bit (LSB) group of n–2 bits, namely, n–2 fractional bits;

(b) a first adder having:
(1) a first input connected to receive the n-bit MSBS group from the double precision multiplier;
(2) a second input connected to receive the n-bit output of the below-recited second right shifter; and
(3) an n-bit output, the output being the output of the enhanced multiplier;

(c) a first bit splitter constructed to:
(1) receive as its input the n–2 bit LSB group from the double precision multiplier; and
(2) produce an output comprising the n–3 MSBs of its input, the LSB of the n–2 bit input being discarded;

(d) a first right shifter constructed to:
(1) receive as its input the n–3 output of the first bit splitter; and
(2) produce an n-bit output comprising three zeroes followed by the n–3 bits of its input;

(e) a second adder having:
(1) a first input connected to receive the n-bit output of the first right shifter;
(2) a second input connected to receive the n-bit output of the below-recited third adder; and
(3) an n-bit output;

(f) a second bit splitter constructed to:
(1) receive as its input the n-bit output of the second adder;
(2) produce a first output comprising the 3 MSBs of its input; and
(3) produce a second output comprising the n–3 LSBs of its input;

(g) a second right shifter constructed to:
(1) receive as its input the 3 bit first output (sign bit, integer bit, and most significant fractional bit) of the second bit splitter;
(2) produce an n-bit output comprising:
(A) as its n–2 MSBs, n–2 repetitions of the sign bit; followed by
(B) the integer input bit; followed by
(C) the most significant fractional input bit; and
(3) apply its n-bit output to the second input of the first adder;

(h) a third right shifter constructed to:
(1) receive as its input the n–3 bit second output of the second bit splitter; and
(2) produce an n-bit output comprising three zeroes followed by the n–3 bits of its input;

(i) a first delay unit connected to receive, as its input, the n-bit output of the third right shifter;

(j) a doubler connected to receive, as its n-bit input, an output of the first delay unit;

(k) a second delay unit also connected to receive, as its n-bit input, the output of the first delay unit; and (l) a third adder:
(1) connected to receive, at a plus input, the n-bit output of the doubler;
(2) connected to receive, at a minus input, an n-bit output of the second delay unit; and
(3) an n-bit output of the third adder being connected to a second input of the second adder.

3. An enhanced single-precision arithmetic multiplier for multiplying together two numbers, each number having n bits, namely, one sign bit, one integer bit, and n–2 fractional bits, wherein the enhanced multiplier has an output and comprises:

(a) a double precision multiplier constructed to multiply together the two numbers and to produce a product which has 2n–2 bits, the product comprising:
(1) a most significant bit (MSBS) group of n bits, namely, one sign bit, one integer bit, and n–2 fractional bits; and
(2) an unsigned least significant bit (LSB) group of n–2 bits, namely, n–2 fractional bits;

(b) a first adder having:
  (1) a first input connected to receive the n-bit MSBS group from the double precision multiplier;
  (2) a second input connected to receive the n-bit output of the below-recited second right shifter; and
  (3) an n-bit output, the output being the output of the enhanced multiplier;
(c) a first bit splitter constructed to:
  (1) receive as its input the n–2 bit LSB group from the double precision multiplier; and
  (2) produce an output comprising the n–3 MSBs of its input, the LSB of the n–2 bit input being discarded;
(d) a first right shifter constructed to:
  (1) receive as its input the n–3 output of the first bit splitter; and
  (2) produce an n-bit output comprising three zeroes followed by the n–3 bits of its input;
(e) a second adder having:
  (1) a first input connected to receive the n-bit output of the first right shifter;
  (2) a second input connected to receive the n-bit output of the below-recited switch; and
  (3) an n-bit output;
(f) a second bit splitter constructed to:
  (1) receive as its input the n-bit output of the second adder;
  (2) produce a first output comprising the 3 MSBs of its input; and
  (3) produce a second output comprising the n–3 LSBs of its input;
(g) a second right shifter constructed to:
  (1) receive as its input the 3 bit first output (sign bit, integer bit, and most significant fractional bit) of the second bit splitter;
  (2) produce an n-bit output comprising:
    (A) as its n–2 MSBs, n–2 repetitions of the sign bit; followed by
    (B) the integer input bit; followed by
    (C) the most significant fractional input bit; and
  (3) apply its n-bit output to the second input of the first adder;
(h) a third right shifter constructed to:
  (1) receive as its input the n–3 bit second output of the second bit splitter; and
  (2) produce an n-bit output comprising three zeroes followed by the n–3 bits of its input;
(i) a first delay unit connected to receive, as its input, the n-bit output of the third right shifter;
(j) a doubler connected to receive, as its n-bit input, an output of the first delay unit;
(k) a second delay unit also connected to receive, as its n-bit input, the output of the first delay unit;
(l) a third adder:
  (1) connected to receive, at a plus input, the n-bit output of the doubler;
  (2) connected to receive, at a minus input, an n-bit output of the second delay unit; and
  (3) an n-bit output of the third adder being connected to the below recited switch; and
(m) a switch which may selectively connect an n-bit second input of the second adder to exactly one of:
  (1) the n-bit output of the first delay unit; and
  (2) the n-bit output of the third adder.

4. The enhanced multiplier of claim 3, wherein the switch may selectively connect the n-bit second input of the second adder to exactly one of:
  (1) the n-bit output of the first delay unit;
  (2) the n-bit output of the third adder; and
  (3) an n-bit fixed rounding number R.

5. The enhanced multiplier of claim 4, wherein $R=\frac{1}{4}$.

* * * * *